United States Patent

Hammock et al.

[11] Patent Number: 6,016,904
[45] Date of Patent: Jan. 25, 2000

[54] RESERVOIR SYSTEM FOR ROD-LIKE ARTICLES

[75] Inventors: Michael Thomas Hammock, Bucks; Roderick Leslie Mitchell, Warks, both of United Kingdom

[73] Assignee: Molins PLC, United Kingdom

[21] Appl. No.: 09/089,509

[22] Filed: Jun. 3, 1998

[30] Foreign Application Priority Data

Jun. 6, 1997 [GB] United Kingdom .................. 9711324

[51] Int. Cl.⁷ ............................................. B65G 21/14
[52] U.S. Cl. ............................................. 198/812; 198/778
[58] Field of Search .................................. 198/594, 778, 198/812; 131/282, 283

[56] References Cited

U.S. PATENT DOCUMENTS

| 4,367,618 | 1/1983 | Focke . | |
| 4,565,284 | 1/1986 | Seragnoli et al. | 198/812 |
| 5,413,213 | 5/1995 | Golz et al. | 198/778 |
| 5,680,923 | 10/1997 | Gram | 198/778 |

FOREIGN PATENT DOCUMENTS

| 0 544 085 A1 | 6/1993 | European Pat. Off. . |
| 0 738 478 A2 | 10/1996 | European Pat. Off. . |
| 1 301 843 | 1/1973 | United Kingdom . |

*Primary Examiner*—Joseph E. Valenza
*Attorney, Agent, or Firm*—Antonelli, Terry, Stout & Kraus, LLP

[57] ABSTRACT

A variable capacity reservoir for cigarettes or similar rod-like articles comprises a pair of fixed upwardly extending helical guides located above the normal plane of conveyance of a laterally-flexible mass flow conveyor, and a drive carriage carrying wheels engageable with the conveyor and rotatable about the axis of the helical guides so as to reversibly deflect a variable length of conveyor around said guides. As the conveyor is advanced into or retracted from the helical guides, it is correspondingly transferred from or to a store arranged below the guides.

19 Claims, 2 Drawing Sheets

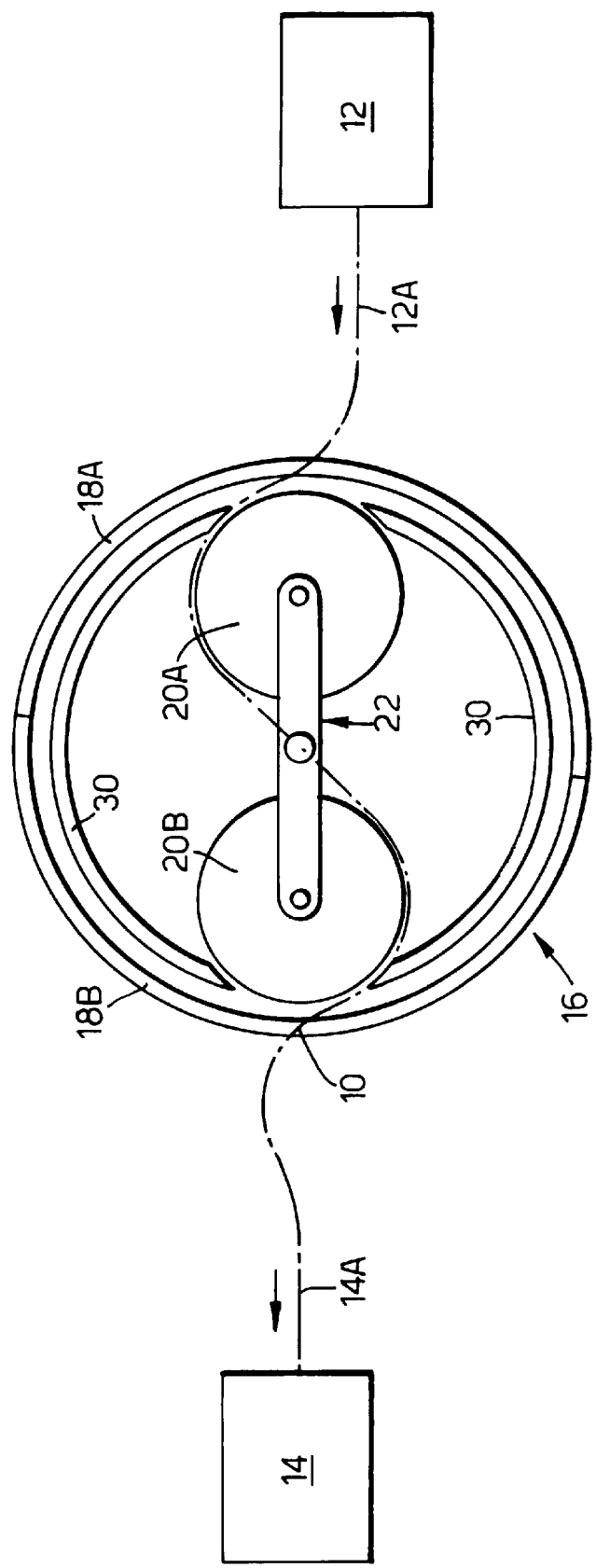

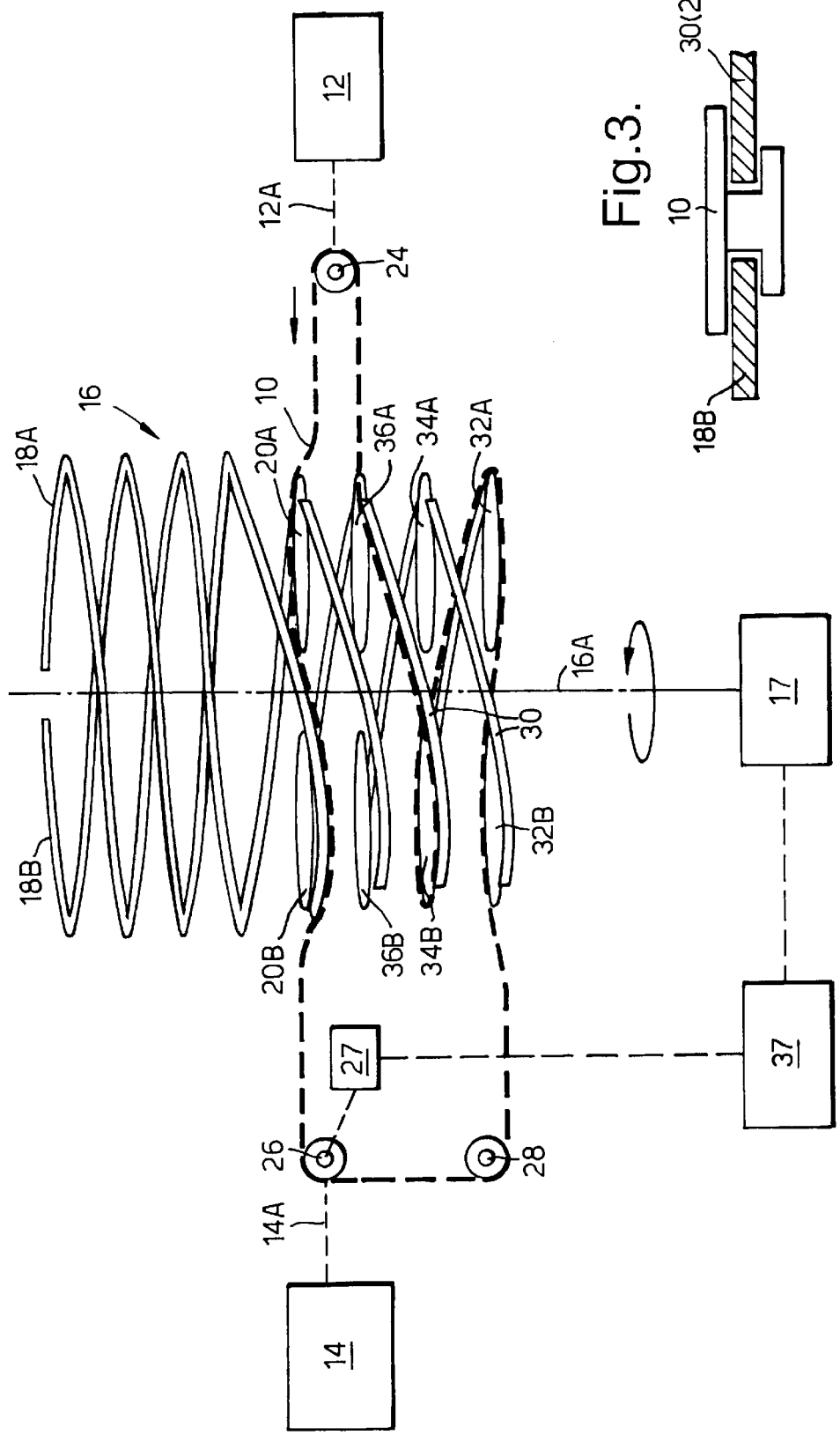
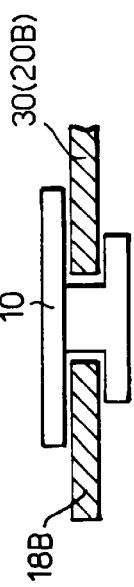

RESERVOIR SYSTEM FOR ROD-LIKE ARTICLES

This invention relates to reservoir systems for rod-like articles, particularly articles of the tobacco industry such as cigarettes or cigarette filter rods.

In the manufacture of articles of the tobacco industry, it is common to transport the articles directly from a delivery device such as a producing machine to a receiving device such as a packing machine, with the articles being conveyed in the form of a continuous multi-layer stream of articles moving in a direction transverse to the lengths of the articles. Typically such streams are 90–100 mm in height. It is known to provide conveyor systems for such articles which incorporate a buffer reservoir facility for accommodating temporary or longer term differences in the rates of operation of the delivery and receiving devices. Known buffer reservoirs providing this facility may incorporate variable length conveyors for storing directly a stream of articles in multi-layer stack formation. Such known buffer reservoirs include those of the so-called first-in first-out (FIFO) type where the first articles which enter the reservoir are the first to leave. Examples of such reservoirs are disclosed in British Patent Specification No 1301843 and U.S. Pat. No. 5,413,213. This latter specification discloses one form of FIFO reservoir in which a variable length conveyor is guided on first and second helical paths extending concentrically around a common vertical axis.

According to one aspect the invention provides a reservoir system for rod-like articles in multi-layer stack formation, comprising endless conveyor means, first guide means defining generally helical paths for said conveyor means about an axis, said paths extending in generally parallel and opposite directions, and reversible means for advancing said conveyor means relative to said guide means so as to locate a variable portion of its length on said paths. Preferably the portion of said conveyor means not on said paths for the time being is supported by the second guide means: this may comprise means which is movable relative to said first guide means and may conveniently comprise means defining further helical paths corresponding in dimensions to said helical paths defined by said first guide means.

According to another aspect, the invention provides a reservoir system for rod-like articles in multi-layer stack formation, comprising endless conveyor means, first guide means defining generally helical paths for said conveyor means about an axis, said paths extending in generally parallel and opposite directions, and second guide means for said conveyor means which is reversibly movable relative to said first guide means between a first position in which it is at least partially displaced from said first guide means and a second position at which said first and second guide means at least partly define common paths for said conveyor means. Preferably said first and second guide means support said conveyor means on said helical paths.

The invention will be further described, by way of example only, with reference to the accompanying diagrammatic drawings, in which:

FIG. 1 is a plan view of a mass flow reservoir system for cigarettes,

FIG. 2 is a schematic side view of the reservoir in the system of FIG. 1, and

FIG. 3 is a transverse sectional view of a conveyor arrangement in the system of FIG. 1.

The system shown in FIG. 1 comprises a laterally flexible endless conveyor 10 on which a multi-layer stream of cigarettes in mass flow formation may be transported on a path extending from a cigarette making machine 12 to a cigarette packing machine 14. The conveyor 10 may typically comprise a conveyor similar to that used on Molins' CONCORD reservoir system: one such form of conveyor is available under the trade name SKF FLEX-Link. Endless conveyors 12A and 14A respectively extend between the ends of the operative run of conveyor 10 and the making machine 12 and packing machine 14.

The system includes a reservoir 16 comprising a pair of fixed upwardly extending outer helical guides 18A, 18B nested to form a two-start helix extending above the plane in which the conveyor 10 lies upstream and downstream of the reservoir 16. In the region of the reservoir 16 the conveyor 10 passes around a pair of wheels 20A, 20B which are mounted on a drive carriage 22. In the position shown in FIGS. 1 and 2, which corresponds to a minimum or empty condition of the reservoir 16, the conveyor 10 has an upper or operative run which extends from an upstream pulley 24 to a downstream pulley 26 including a portion in the reservoir 16 which extends around the pulleys 20A and 20B generally in the form of an S. The remainder of the conveyor 10, forming the return run, passes around one or more further pulleys 28 and then onto a series of generally semi-circular inner guides 30 which, together with wheels 32A, 32B, 34A, 34B and 36A, 36B, define a generally helical path, as best seen in FIG. 2. The inner guides 30 and wheels 32–36 are connected to the drive carriage 22 (by structure not shown in the drawing) so as to be rotatable about the central longitudinal axis 16A of the reservoir 16 and at the same time movable axially relative to this axis, so that the carriage and inner guides and wheels etc., are reversibly movable upwardly within the helical guides 18A and 18B (which do not rotate). Drive for the carriage 22 etc may be derived from a shaft extending along the axis 16A and connected to drive means 17 providing the rotational and longitudinal movement.

In operation, the conveyor 10 is driven, e.g. by a motor 27 connected to the pulley 26, to advance a stream of cigarettes in a direction from the making machine 12 towards the packing machine 14. While the supply from the making machine 12 matches the demand of the packing machine 14, the drive carriage 22 remains stationary. If the speed of the making machine 12 exceeds that of the packing machine 14, the reservoir 16 is operated to store cigarettes. In this mode the drive carriage 22 rotates anti-clockwise as viewed in FIG. 1 and at the same time moves upward with a pitch corresponding to that of the helical guides 18A, 18B. During this upward movement, the conveyor 10 is progressively displaced upwards into the reservoir along helical paths defined by the guides 18A and 18B. The outer sides of the conveyor 10 are supported by the guides 18A and 18B; the inner sides of the conveyor are supported by the wheels 20A, 20B, 32A, 32B, etc., and by the inner guides 30. Thus, conveyor 10 is progressively transferred from the lower inoperative or return path to an upper, operative path, so as effectively to increase the operative path length of the conveyor 10 through the reservoir 16 and hence increase the reservoir capacity. Conversely, when the reservoir 16 is other than empty, when the speed of the packing machine 14 is greater than that of the making machine 12, the drive carriage is rotated in the opposite direction (i.e. clockwise as viewed in FIG. 1) so that the capacity of the reservoir is decreased and the flow of cigarettes to the packing machine is supplemented.

It will of course be understood that, as is well known in control of conveyance of mass-flow streams of cigarettes, a control system, including a processor indicated at 37, and including sensors (not shown) located at appropriate positions (e.g. speed sensors at the machines 12 and 14 and/or level sensors for the streams), may determine the speed of the conveyor 10 as well as the rate of rotation of the drive carriage 22, so as to ensure that the flows of cigarettes from the making machine 12 and to the packing machine 14 are optimised to the extent possible within the parameters of the system.

We claim:

1. A reservoir system for rod-like articles in multi-layer stack formation, comprising endless conveyor means, first guide means defining generally helical paths for said conveyor means about an axis, said paths extending in generally parallel and opposite directions, reversible means for advancing said conveyor means relative to said guide means so as to locate a variable portion of its length on said paths, and second guide means for supporting the portion of said conveyor means not on said paths for the time being, said second guide means including at least one planetary wheel movable about said axis.

2. A system as claimed in claim 1, including means for moving said second guide means relative to said first guide means.

3. A system as claimed in claim 2, wherein said moving means is operable to move at least part of said guide means in a direction parallel to said axis.

4. A system as claim in claim 3, wherein said moving means is operable to rotate at least part of said second guide means about said axis.

5. A system as claimed in claim 2, wherein said second guide means includes means defining further helical paths corresponding in dimensions to said helical paths defined by said first guide means.

6. A system as claimed in claim 5, wherein said first and second guide means cooperate to provide respective radially inner and radially outer support for a portion of said conveyor means extending around said axis on said paths.

7. A system as claimed in claim 1, wherein said first guide means comprises two stationary guides extending helically around said axis and having respective ends disposed in substantially opposite positions relative to said axis.

8. A reservoir system, for rod-like articles in multi-layer stack formation, comprising endless conveyor means, first guide means defining generally helical paths for said conveyor means about an axis, said paths extending in generally parallel and opposite directions, reversible means for advancing said conveyor means relative to said guide means so as to locate a variable portion of its length on said paths, and second guide means for supporting the portion of said conveyor means not on said paths for the time being, wherein said second guide means includes at least one wheel and at least one carrier for said wheel, said carrier being rotatable about said axis so that a portion of said conveyor means engaged by said wheel is caused to assume an arcuate path around said axis on displacement of said carrier about said axis.

9. A system as claim in claim 8, wherein said second guide means includes a plurality of wheels disposed at positions about said axis such as at least partly to define a helical path corresponding in dimension to said paths defined by said first guide means.

10. A system as claimed in claim 9, wherein said second guide means includes a series of arcuate guides extending between adjacent wheels and further defining said helical path.

11. A reservoir system for rod-like articles in multi-layer stack formation, comprising endless conveyor means, first guide means defining generally helical paths for said conveyor means about an axis, said paths extending in generally parallel and opposite directions, and second guide means for said conveyor means which is reversibly movable relative to said first guide means between a first position in which it is at least partially displaced from said first guide means and a second position at which said first and second guide means at least partly define common paths for said conveyor means, said second guide means including at least one planetary wheel movable about said axis.

12. A system as claimed in claim 11, wherein said first and second guide means support said conveyor means on said helical paths.

13. A reservoir system for rod-like articles in multi-layer stack formation, comprising endless conveyor means, first guide means defining generally helical paths for said conveyor means about an axis, said paths extending in generally parallel and opposite directions, and second guide means for said conveyor means which is reversibly movable relative to said first guide means between a first position in which it is at least partially displaced from said first guide means and a second position at which said first and second guide means at least partly define common paths for said conveyor means, wherein said first and second guide means support said conveyor means on said helical paths, and wherein said endless conveyor means extends in a plane upstream and downstream of said first and second guide means, said first guide means extending on one side of said plane, and in said first position said second guide means extends at least partly on the other side of said plane.

14. A reservoir system for rod-like articles in multi-layer stack formation, comprising a pair of oppositely wound, fixed helical guides of substantially equal diameter mounted coaxially so as to define a cylindrical space, a rotatable guide mechanism mounted coaxially with said helical guides so as to be movable into and out of said cylindrical space with rotation thereof in respective directions, and an endless conveyor disposed so as to pass through said cylindrical space in engagement with at least one of said helical guides and said rotatable guide mechanism, so that, as said rotatable guide mechanism is rotated, a variable portion of the length of said conveyor occupies said cylindrical space.

15. A system as claimed in claim 14, wherein said helical guides and said rotatable guide mechanism cooperate to provide respective radially inner and radially outer support for a portion of said conveyor occupying said cylindrical space.

16. A system as claimed in claim 14, wherein said rotatable guide mechanism includes at least one planetary wheel movable about the axis of said cylindrical space to provide radially inner support for a portion of said conveyor occupying said cylindrical space.

17. A system as claimed in claim 14, wherein said endless conveyor extends in a plane upstream and downstream of said cylindrical space, said helical guides extending on one side of said plane, and said rotatable guide mechanism being movable upon rotation thereof between a first position in which it is at least partially displaced from said helical guides and a second position at which said helical guides and said rotatable guide mechanism at least partly define a path for said conveyor which winds axially within said cylindrical space.

18. A system as claimed in claim 14, wherein said rotatable guide mechanism includes at least one wheel and at least one carrier for said wheel, said carrier being rotatable about the axis of said cylindrical space so that a portion of said conveyor engaged by said wheel is caused to assume an arcuate path around said axis on displacement of said carrier about said axis.

19. A system as claimed in claim 14, wherein said rotatable guide mechanism includes a plurality of wheels disposed at positions about the axis of said cylindrical space such as to at least partly define a helical path corresponding in dimension to paths defined by said helical guides.

\* \* \* \* \*